United States Patent
Ono

(10) Patent No.: US 6,664,968 B2
(45) Date of Patent: Dec. 16, 2003

(54) DISPLAY DEVICE AND IMAGE DISPLAYING METHOD OF DISPLAY DEVICE

(75) Inventor: Makoto Ono, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 09/753,429

(22) Filed: Jan. 3, 2001

(65) Prior Publication Data

US 2001/0022587 A1 Sep. 20, 2001

(30) Foreign Application Priority Data

Jan. 6, 2000 (JP) ....................................... 2000-001139

(51) Int. Cl.[7] ................................................ G09G 5/39
(52) U.S. Cl. ...................... 345/532; 345/534; 345/536; 345/539; 345/87
(58) Field of Search ................................ 345/503, 520, 345/531, 533, 534, 536, 539, 545, 87, 33, 38, 50, 55

(56) References Cited

U.S. PATENT DOCUMENTS

| | | | | |
|---|---|---|---|---|
| 5,587,726 A | * | 12/1996 | Moffat | 345/539 |
| 5,815,135 A | * | 9/1998 | Yui et al. | 345/97 |
| 5,874,928 A | * | 2/1999 | Kou | 345/1.1 |
| 5,929,832 A | * | 7/1999 | Furukawa et al. | 345/98 |
| 5,956,046 A | * | 9/1999 | Kehlet et al. | 345/502 |
| 6,040,826 A | * | 3/2000 | Furukawa | 345/534 |
| 6,118,461 A | * | 9/2000 | Taylor | 345/520 |
| 6,323,875 B1 | * | 11/2001 | Millman et al. | 345/619 |

OTHER PUBLICATIONS

G. Humphreys and P. Hanrahan, "A Distributed Graphics System For Large Tiled Displays", Proceedings Visualization '99, pp. 215–223.*

* cited by examiner

*Primary Examiner*—Ulka J. Chauhan
(74) *Attorney, Agent, or Firm*—Ido Tuchman; Derek S. Jennings

(57) ABSTRACT

The monitor system comprises the display device which has a screen having a display area virtually divided into a plurality of sub-screens. Provided are graphics adapters, each of which has two frame buffers, so as to correspond to the sub-screens of the display device.

10 Claims, 11 Drawing Sheets

DISPLAY DEVICE AND IMAGE DISPLAYING METHOD OF DISPLAY DEVICE

BACKGROUND OF THE INVENTION

The present invention relates to a display device, more particularly to a display device which is capable of easily performing synchronization of three-dimensional graphics with a high resolution.

Although a CRT display showed slow progress with regard to a resolution, the resolution is about to make rapid progress with introductions of new technologies represented by a liquid crystal display. Specifically, the resolution of the liquid crystal display can be increased relatively easily in comparison with the CRT display by performing a fine process on the liquid crystal display.

A personal computer (PC) comprises a device referred to as a graphics adapter, which performs a control to display an image on a display. The graphics adapter has a memory for writing the images displayed on the display. This memory is called a frame buffer.

If the resolution of the display is made to be, for example, four times as high as before, also a memory capacity of the frame buffer of the graphics adapter needs to be enlarged by four times. It should be noted that in order to display the image, a mere increase in the memory capacity does not suffice. A processing speed of peripheral circuits also requires to be made approximately four times as high. However, there are problems that this is not easy and that the cost of the display devices with features as described above becomes high.

SUMMARY OF THE INVENTION

A feature of the present invention is to solve the foregoing problems, and to realize a monitor system which incorporates a display device with high resolution at a low cost.

Another feature of the present invention is to provide a display device in such a monitor system, which makes it possible to perform a synchronization in switching a buffer, particularly a liquid crystal display device.

Another aspect of the present invention provides a liquid crystal display device as described below, which can be applied to the display device of the foregoing monitor system. The liquid crystal display device of the present invention comprises a liquid crystal panel composed of a plurality of sub-screens. The liquid crystal panel forms one screen by assembling images displayed on the sub-screens. First and second buffers are provided so as to correspond to each of the sub-screens. A writing selector is provided for selecting into which buffer of the first and second buffers image data supplied from the outside should be written. Finally, a display selector for selecting which image data written in the first and second buffers should be displayed on the sub-screens.

Still another feature according to the present invention is to provide a display device which comprises an image data storing section having a plurality of double buffers. A first selector is provided for each of the double buffers. The first selector selects which buffer of the double buffers image data transferred from the outside should be stored. A second selector is provided for each of the double buffers. The second selector selects from which buffer of the double buffers the image data should be read out. An image display panel displays an image based on the image data read out of the selected buffer by the second selector. Finally, a controller issues an instruction to the selector a buffer by using either the first or second selectors.

According to yet another feature of the present invention with regards to the display device, the second selector notifies the controller of completion of reading-out of the image data in all of the double buffers. The controller can issue an instruction to switch a selection to the first selector based on the notification from the second selector.

Yet another feature, according to the present invention is a method of displaying an image on a display device in which first and second frame buffers are provided so as to correspond to each of partial display areas obtained by dividing a display area. A first step reads out image data written in the second frame buffer, while image data is written into the first frame buffer. Another step is included for displaying image data read out from the second frame buffer on the partial display areas. Yet another step is disclosed for stopping an operation of the first frame buffer after completion of writing image data into the first frame buffer. Still another step is disclosed for reading out the image data written in the first frame buffer after stopping the operation of the first frame buffer, and displaying the image data read out from the first frame buffer on the partial display areas. A final step of writing image data into the second frame buffer is further disclosed.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

Embodiments of the present invention will be described below with reference to the accompanying drawings.

A multi-monitor system has been heretofore known. This multi-monitor system can be said to be a certain technique for realizing a high resolution display though it does not realize a high resolution of the display device itself. This multi-monitor system prepares a plurality of graphics adapters, and in this system, one screen consists of an assembly of images displayed on displays, each of which corresponds to corresponding one of the adapters. In this system, each graphics adapter operates independently from each other, and one screen is virtually constituted by software on the system side. The present invention basically aims at realizing the conventional multi-monitor system with a single display. Specifically, a display area of a screen is divided into a plurality of sub-screens, and graphics adapters are provided for the respective sub-screens. In other words, the monitor system of the present invention comprises a display device having a screen in which its display area is virtually divided into a plurality of sub-screens. Graphics adapters are provided for corresponding to one of the sub-screens of the display device and has two frame buffers. Further discussed is a controller for controlling the graphics adapters.

The monitor system of the present invention has a structure that the single screen is virtually divided into the plurality of sub-screens, and the graphics adapters are provided so as to correspond to the respective sub-screens. Accordingly, since the number of pixels of the sub-screen is smaller than that of the entire screen even in the case that the resolution of the screen is made to be higher, a quantity of pixels to be processed by the graphics adapter corresponding to the sub-screen can be reduced. This implies that the graphics adapters can deal with a display with a high resolution without any increase in memory capacity of the frame buffer constituting the graphics adapter. In consideration with the foregoing example, in which the resolution is quadruplicated, even if the resolution of the entire screen is quadruplicated, if only the screen is divided into four, graphics adapters that have not yet modified so as to deal with a high resolution can be used as the ones corresponding to the respective sub-screens, and a processing speed of each graphics adapter can be made to be equal to that of the conventional one.

Figure 1:
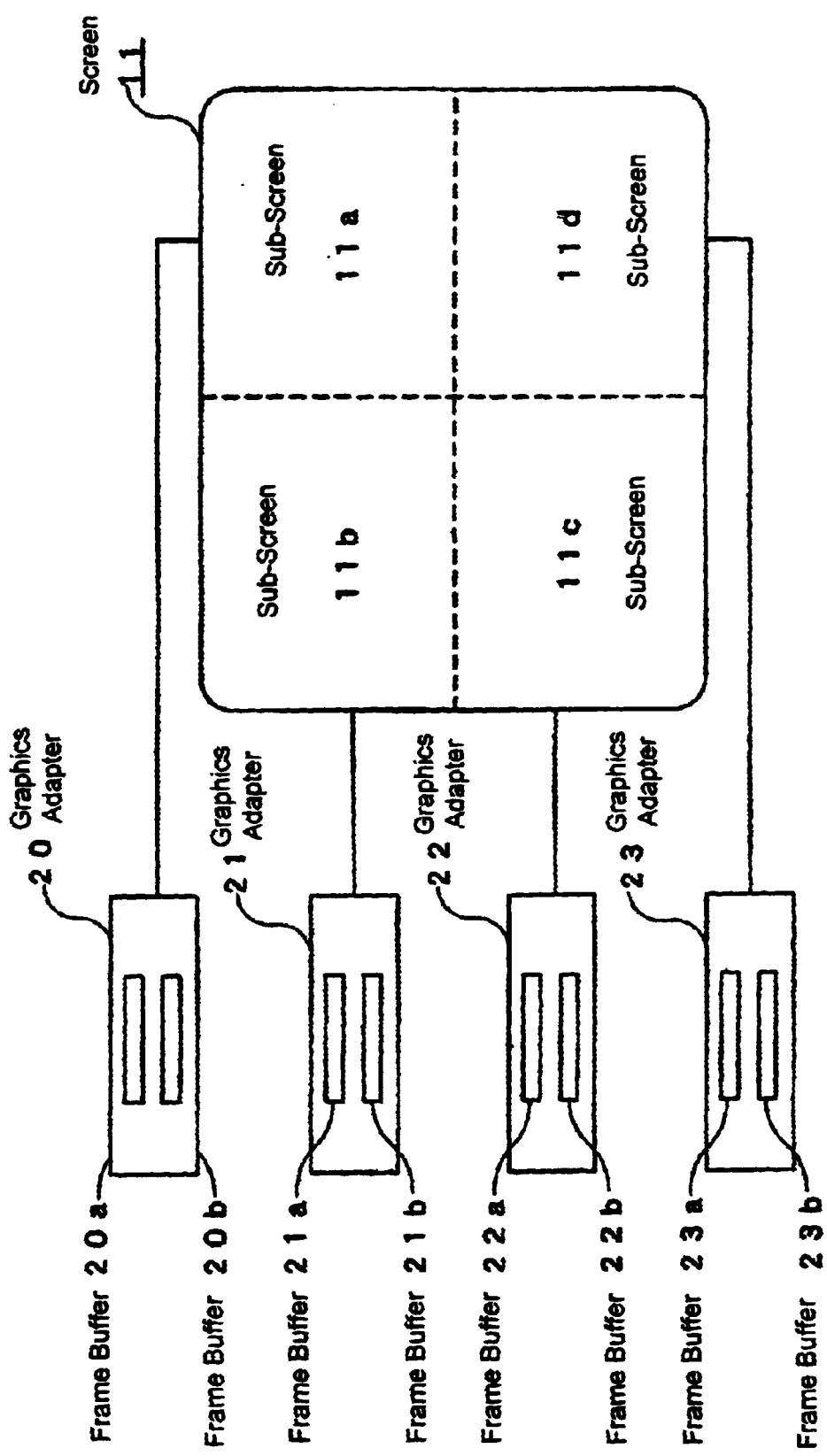
FIG. 1 is a diagram showing a concept of a monitor system of the present invention.

The concept of the monitor system of the present invention is illustrated as shown in FIG. 1. The reason why FIG. 1 is used is to facilitate understanding of the present invention, and FIG. 1 never defines the technical scope of the present invention. In FIG. 1, reference numeral 11 denotes a screen, and reference numerals 20 to 23 denote graphics adapters. The screen 11 is divided into sub-screens 11a to 11d, and graphics adapters 20 to 23 are provided for the corresponding sub-screens 11a to 11d, respectively. The graphics adapters 20 to 23 comprise respectively two frame buffers 20a, 20b; 21a, 21b; 22a, 22b and 23a, 23b.

Figure 2:
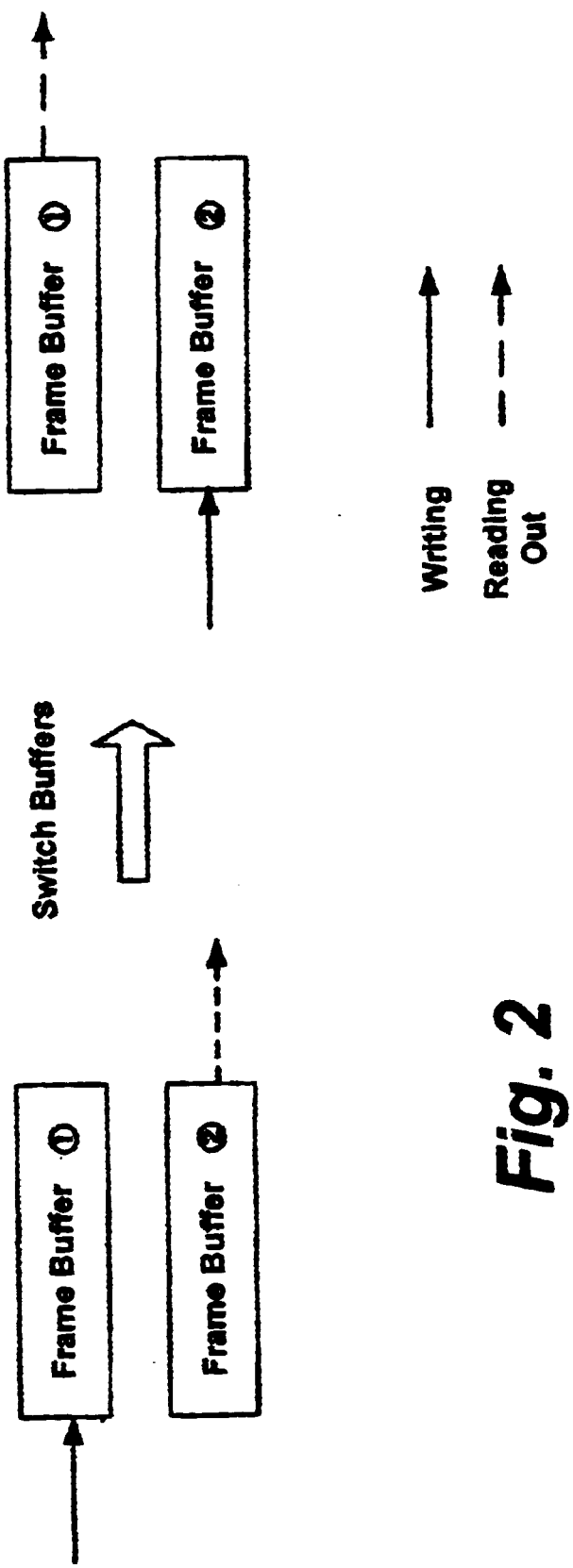
FIG. 2 is a diagram for explaining a double buffer.

As described above, the graphics adapters of the monitor system of the present invention comprise respectively two frame buffers. The provision of the two frame buffers is called a double buffer. The double buffer is a basic technique in three-dimensional graphics. Specifically, as shown in FIG. 2, in the double buffer, two frame buffers (1) and (2) are prepared, and image data written to the frame buffer (2) is read out and the image data read out is displayed on the screen while image data is being written into the frame buffer (1). At the moment when the writing of the image data into the frame buffer (1) is completed, the image data read out from the frame buffer (1) is displayed on the screen instead of the image data read out from the frame buffer (2). Thereafter, the subsequent image data is written into the frame buffer (2). Since images displayed on the screen always show completed graphics by adopting this double buffer technique, the user never looks at an image which is being written.

Although the double buffer is an essential technique for the three-dimensional graphics processing, it must be considered that loads applied on the graphics adapters differ from each other in the monitor system of the present invention. In other words, when there are a plurality of graphics adapters, a quantity of image data to be processed by each graphics adapter usually differs individually. Accordingly, a required time from a start of the writing of the image data into one frame buffer to an end thereof differs depending on each graphics adapter, and a time lag occurs in switching the frame buffers owing to this difference. The time lag of the buffer switching causes lack of a precision of an image to be displayed.

Figure 3:
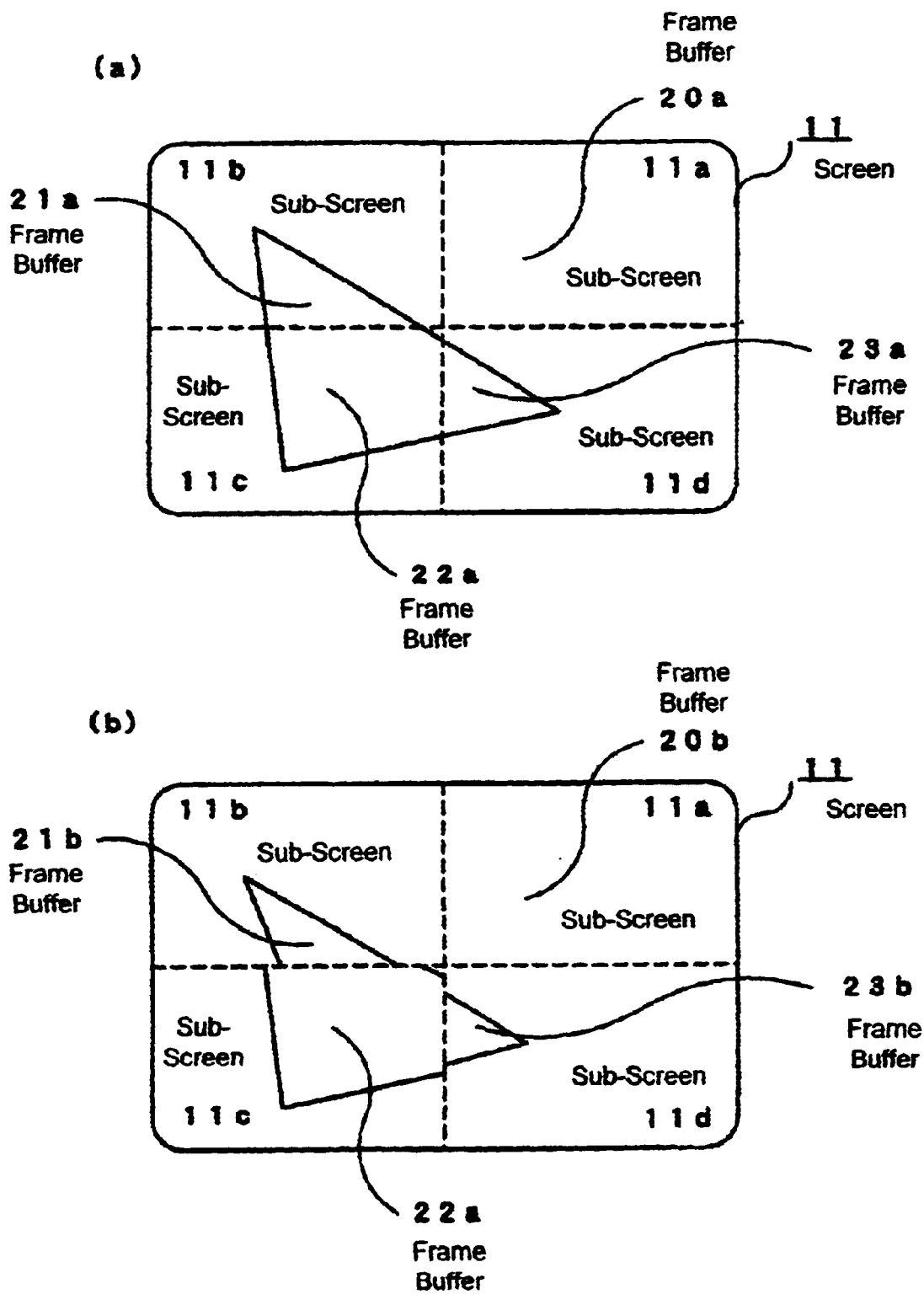
FIG. 3 is a diagram for explaining a display lag due to switchings of frame buffers.

The above-described matter will be described with reference to FIGS. 3(a) and 3(b). In FIGS. 3(a) and 3(b), the screen 11 is divided into the sub-screens 11a to 11d similarly to FIG. 1, and the graphics adapters 20 to 23 are assumed to be connected to the respective sub-screens 11a to 11d. FIG. 3(a) shows a state where image data written in each frame buffer 20a, 21a, 22a and 23a is displayed on corresponding one of the sub-screens 11a, 11b, 11c and 11d. In FIG. 3(a), a quantity of image data written in the frame buffer 22a is the largest, and a quantity of image data written in the frame buffer 20a is the smallest (no image data). Therefore, in the graphics adapters 20, 21 and 23, the switchings from the frame buffers 20a, 21a and 23a to 20b, 21b and 23b, from which image data is read out to be displayed on the screen, are performed faster than that from the frame buffer 22a to 22b. Specifically, a time lag occurs in the switching of the frame buffers. FIG. 3(b) illustrates such a state. Although the image data written in the frame buffers 20b, 21b and 23b are respectively displayed on the sub-screens 11a, 11b and 11d, the image data written in the frame buffer 22a is still displayed on the sub-screen 11c.

As described above, the time lag occurs when the frame buffer in each graphics adapter is switched, and hence, for a realization of the monitor system of the present invention, it is essential to prevent the time lag and to allow the frame buffers to be switched from one to the other so that outputs of the image data can synchronize with each other. Accordingly, in the monitor system of the present invention, pairs of memories are respectively interposed between the graphics adapters and the screens, and a display selector is provided for selecting which image data written to the pair of memories should be displayed on the screen. In other words, in the present invention, the foregoing display device comprises the pairs of the memories, each pair of which corresponds to each of the foregoing sub-screens. A writing memory selector is used for selecting any one of the pairs of the memories as the memory, into which image data supplied from the graphics adapter is written. A reading-out memory selector selects any one of the pairs of the memories, from which image data is read out. In this display device, outputs of the image data to be displayed on the screen are made to synchronize among the plurality of reading-out memory selecting means provided respectively for the plural sub-screens.

In the monitor system of the present invention described above, a controller controls which memory to be selected by the writing memory selector. The controller further has a function to see that the writing memory selector does not select any memory. The controller can be incorporated in the display device or can be also provided outside the display device.

In the liquid crystal display device of the present invention, a selector controller for controlling selections of the writing selector and the display selector is further provided, and the writing selector and the display selector can switch the selection of the first or second buffer based on an instruction from the selector controller. The display selector can switch the selection of the first or second buffer after completion of reading out the image data either from the first buffer or from the second buffer, which is being selected by the display selector.

In the method of displaying an image on the display device, the third step is begun after the reading-out of the image data written in all of the second frame buffers in the first step is completed in the second frame buffer. The third step may be begun after a vertical retrace is completed in all of the partial display areas.

Figure 4:
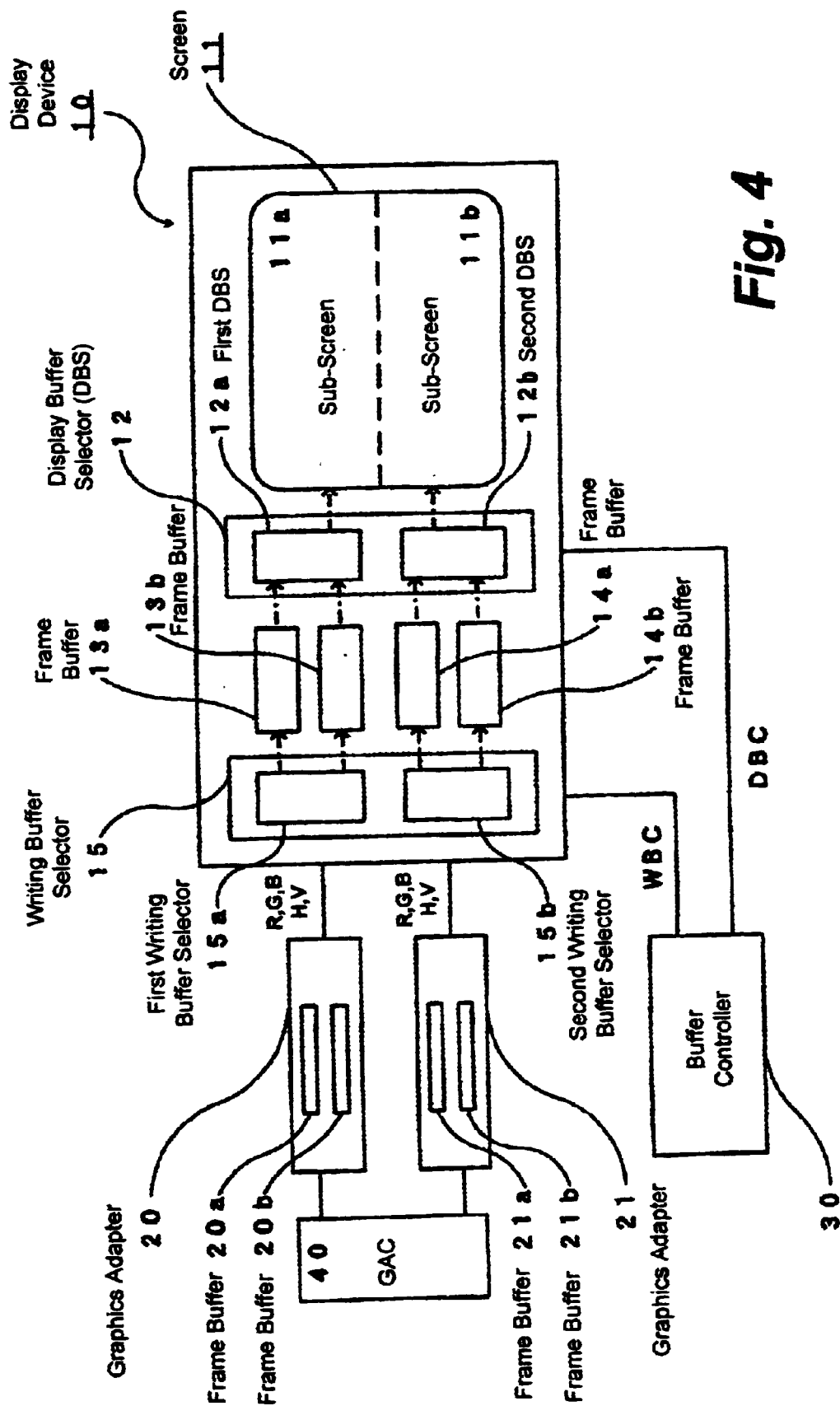
FIG. 4 is a block diagram showing a monitor system according to this embodiment.

FIG. 4 is a block diagram showing a display monitor system according to an embodiment of the present invention.

The display monitor system shown in FIG. 4 comprises a display device 10, graphics adapters 20 and 21 arranged outside the display device 10, a buffer controller 30 and a graphics adapter controller 40.

The display device 10 includes a screen 11 constituted by a liquid crystal display panel, as an image display panel, and this screen 11 has a display area divided into two partial display areas 11a and 11b, that is, two sub-screens. In this embodiment, the display area of the screen 11 is divided into the two sub-screens, but in the present invention, the number of the sub-screens is not limited to two, and the number of the sub-screens may be four as shown in FIG. 1, or may be any other number. Moreover, in the examples shown in FIGS. 1 and 3, the display area of the screen is divided into the sub-screens, each of which has an equal area. But the present invention is not limited to this, and the display area thereof may be divided into sub-screens, each of which has a different area.

The graphics adapter 20 is provided so as to correspond to the sub-screen 11a, and the graphics adapter 21 is provided so as to correspond to the sub-screen 11b. The graphics adapter 20 has frame buffers 20a and 20b, and the graphics adapter 21 has frame buffers 21a and 21b. Each of the graphics adapters 20 and 21 independently controls to select, in response to an instruction from the graphics adapter controller 40, into which frame buffer image data is written. In addition, each of the graphics adapters 20 and 21 independently controls to select, in response to an instruction of the graphics adapter controller 40, from which frame buffer image data is read out to be displayed on the screen 11. The image data composed of color information (R, G, B) and horizontal (H) and vertical (V) synchronization signals is output from each of the graphics adapters 20 and 21. Furthermore, it is possible to synchronize the graphics adapters 20 and 21 with each other by known means, for example, a video signal.

In the display device 10, frame buffers 13a and 13b are provided as a double buffer corresponding to the foregoing sub-screen 11a, and frame buffers 14a and 14b are provided as a double buffer corresponding to the foregoing sub-screen 11b. Consequently, the frame buffers 13a and 13b correspond to the graphics adapter 20, and the frame buffers 14a and 14b correspond to the graphics adapter 21. A display buffer selector 12 is provided between the screen 11 and the frame buffers 13a and 13b and as well as between the screen 11 and the frame buffers 14a and 14b. A writing buffer selector 15 is provided between the frame buffers 13a, 13b, 14a and 14b and the graphics adapters 20 and 21.

The display buffer selector 12 includes a first display buffer selector 12a corresponding to the sub-screen 11a and a second display buffer selector 12b corresponding to the sub-screen 11b. The writing buffer selector 15 includes a first writing buffer selector 15a corresponding to the sub-screen 11a, and a second writing buffer selector 15b corresponding to the sub-screen 11b.

The first writing buffer selector 15a selects which frame buffer of the frame buffer 13a or 13b a color signal from the graphics adapter 20, that is, image data, is written into. Similarly, the second writing buffer selector 15b selects which frame buffer of the frame buffer 14a or 14b a color signal from the graphics adapter 21, that is, image data, is written into. The writing buffer selectors 15a and 15b are controlled by a writing buffer control signal (WBC) from the buffer controller 30 arranged outside the display device 10. In this embodiment, the buffer controller 30 is arranged outside the display device 10, but the buffer controller 30 may be incorporated in the display device 10.

The first display buffer selector 12a selects which image data written in the frame buffer 13a or 13b should be displayed on the sub-screen 11a. Similarly, the second display buffer selector 12b selects which image data written in the frame buffer 14a or 14b should be displayed on the sub-screen 11b. The display buffer selectors 12a and 12b are controlled by a display buffer control signal (DBC) from the buffer controller 30 arranged outside the display device 10.

Next, procedures of switching frame buffer in the display monitor system according to this embodiment will be described with reference to FIGS. 5 to 8. It should be noted that the illustration of the graphics adapter controller 40 is omitted in FIGS. 5 to 8.

Figure 5:
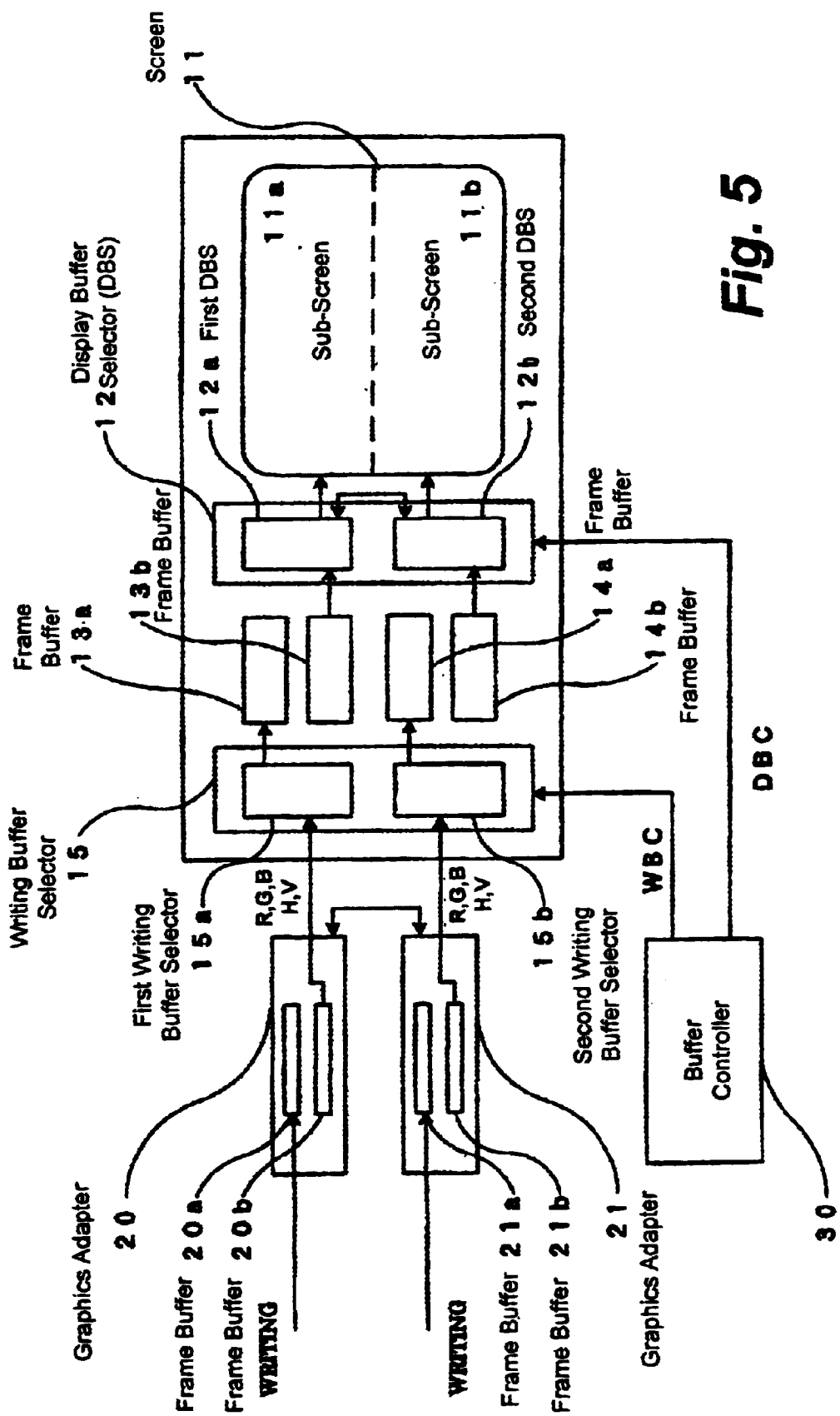
FIG. 5 is a diagram for explaining a step for switching the frame buffers using the monitor system according to this embodiment.

FIG. 5 shows initial conditions of the display monitor system. In the initial conditions, image data written in the frame buffer 20b of the graphics adapter 20 and image data written in the frame buffer 21b of the graphics adapter 21 are output to the display device 10. On the other hand, writings of image data into the frame buffer 20a of the graphics adapter 20 and into the frame buffer 21a of the graphics adapter 21 are being executed.

At this time, in the display device 10, in response to the writing buffer control signal WBC that is a control signal from the buffer controller 30, the first writing buffer selector 15a selects the frame buffer 13a as a destination where the image data output from the graphics adapter 20 is to be written. Similarly, in response to the writing buffer control signal WBC that is a control signal from the buffer controller 30, the second writing buffer selector 15b selects the frame buffer 14a as a destination where the image data output from the graphics adapter 21 is to be written. The arrows in the drawing indicate the selections of the frame buffers 13a and 14a.

In response to the display buffer control signal DBC that is a control signal from the buffer controller 30, the first display buffer selector 12a selects the frame buffer 13b as a frame buffer in which image data to be displayed on the sub-screen 11a is written. Similarly, in response to the display buffer control signal DBC that is a control signal from the buffer controller 30, the second display buffer selector 12b selects the frame buffer 14b as a frame buffer in which image data to be displayed on the sub-screen 11b is written.

It is assumed that the switching between the frame buffers in the graphics adapters 20 and 21 is performed from the above-described initial conditions. Specifically, the switching between the frame buffers 20a and 20b is performed in such a manner that while image data is written into the frame buffer 20b of the graphics adapter 20, image data written in the frame buffer 20a is to be output onto the display device 10. Furthermore, the switching between the frame buffers 21a and 21b is performed in such a manner that while image data is written into the frame buffer 21b of the graphics adapter 21, image data written in the frame buffer 21a is to be output onto the display device 10.

Figure 6:
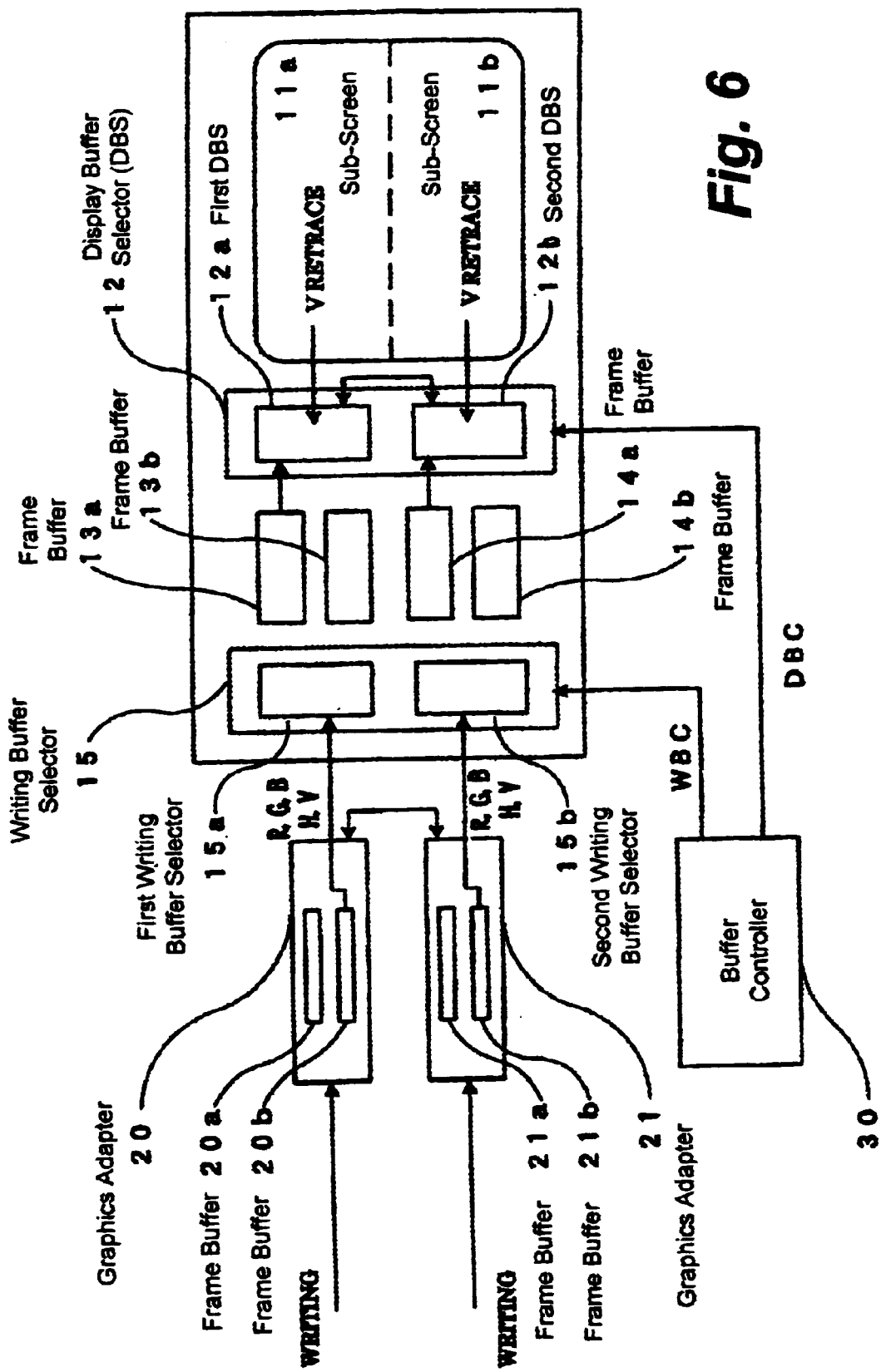
FIG. 6 is a diagram for explaining a step for switching the frame buffers using the monitor system according to this embodiment.

As shown in FIG. 6, the writing buffer selector 15 is switched to a hold state in response to the writing buffer control signal WBC from the buffer controller 30. Specifically, the first writing buffer selector 15a does not select any of the frame buffers 13a and 13b, and the second writing buffer selector 15b does not select any of the frame buffers 14a and 14b.

After the writing buffer selector 15 is switched to the hold state, in accordance with the control of the buffer controller 30, the display buffer selector 12 is about to switch from one frame buffer to the other, from which the image data is read out to be displayed. Specifically, the first display buffer selector 12a is about to switch from the frame buffer 13b to the frame buffer 13a, from which the image data is read out to be displayed. The second display buffer selector 12b is about to switch from the frame buffer 14b to the frame buffer 14a, from which the image data is read out to be displayed.

At the time when the request for switching the frame buffer from one to the other is received, the first display buffer selector 12a selects the frame buffer 13b, from which the image data written is read out to be displayed. Similarly, the second display buffer selector 12b selects the frame buffer 14b, from which the image data is read out to be displayed. Accordingly, the image data written in the frame buffer 13b is displayed on the sub-screen 11a, and the image data written in the frame buffer 14b is displayed on the sub-screen 11b. The first buffer selector 12a and the second buffer selector 12b continue to hold the signal requesting to switch the frame buffers, which is output from the buffer controller 30, immediately before the image data reading-out operation returns to be carried out for the beginning ends of the frame buffers 13b and 14b after this operation is carried out through the terminal ends thereof. The switching of the frame buffers is executed at the time when the image data reading-out operation returns to be carried out for the beginning ends of the frame buffers 13b and 14b. Specifically, after the switching of the frame buffers, the image data written in the frame buffer 13a is displayed on the sub-screen 11a, and the image data written in the frame buffer 14a is displayed on the sub-screen 11b, as shown in FIG. 6.

Figure 7:
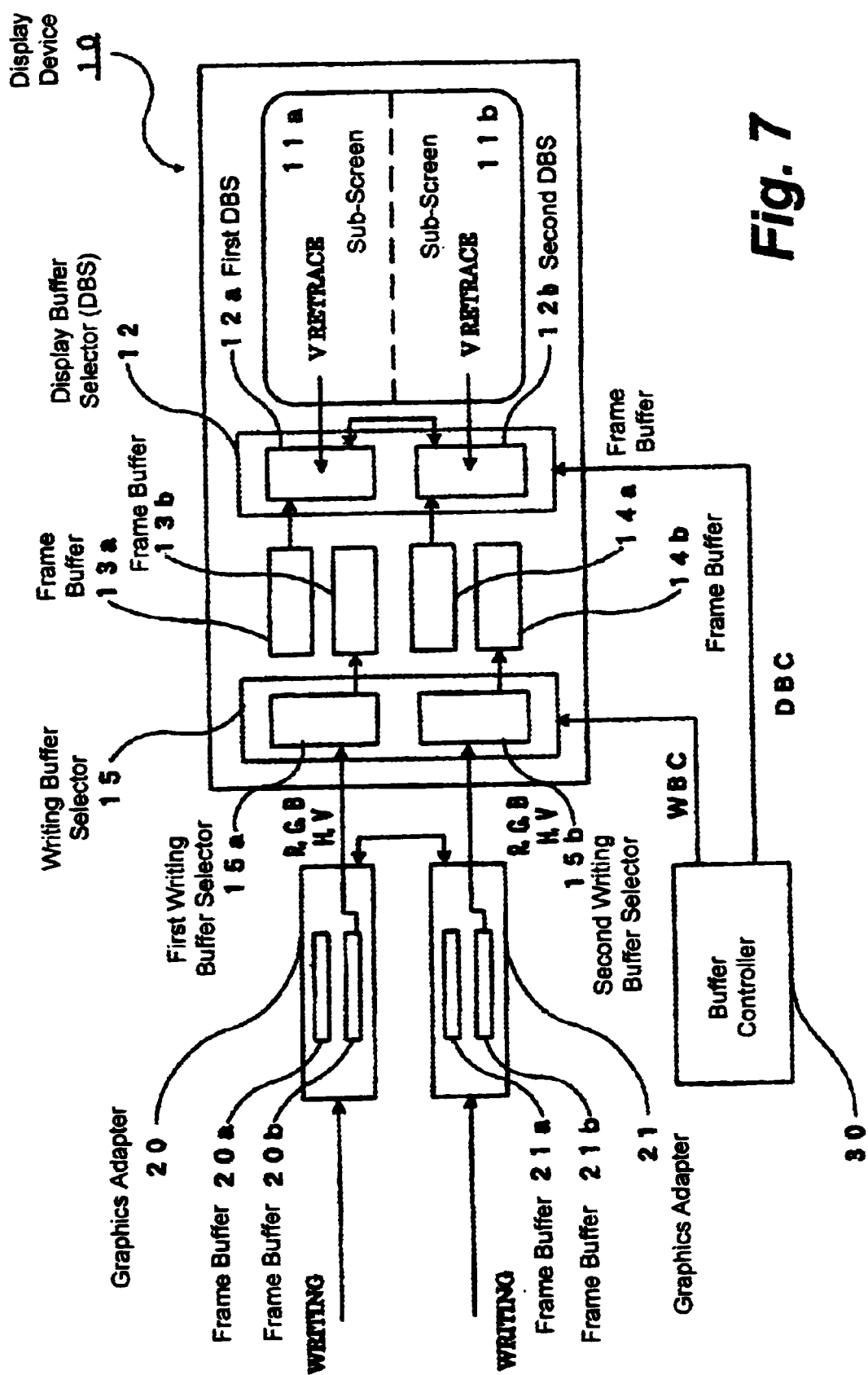
FIG. 7 is a diagram for explaining a step for switching the frame buffers using the monitor system according to this embodiment.
Figure 8:
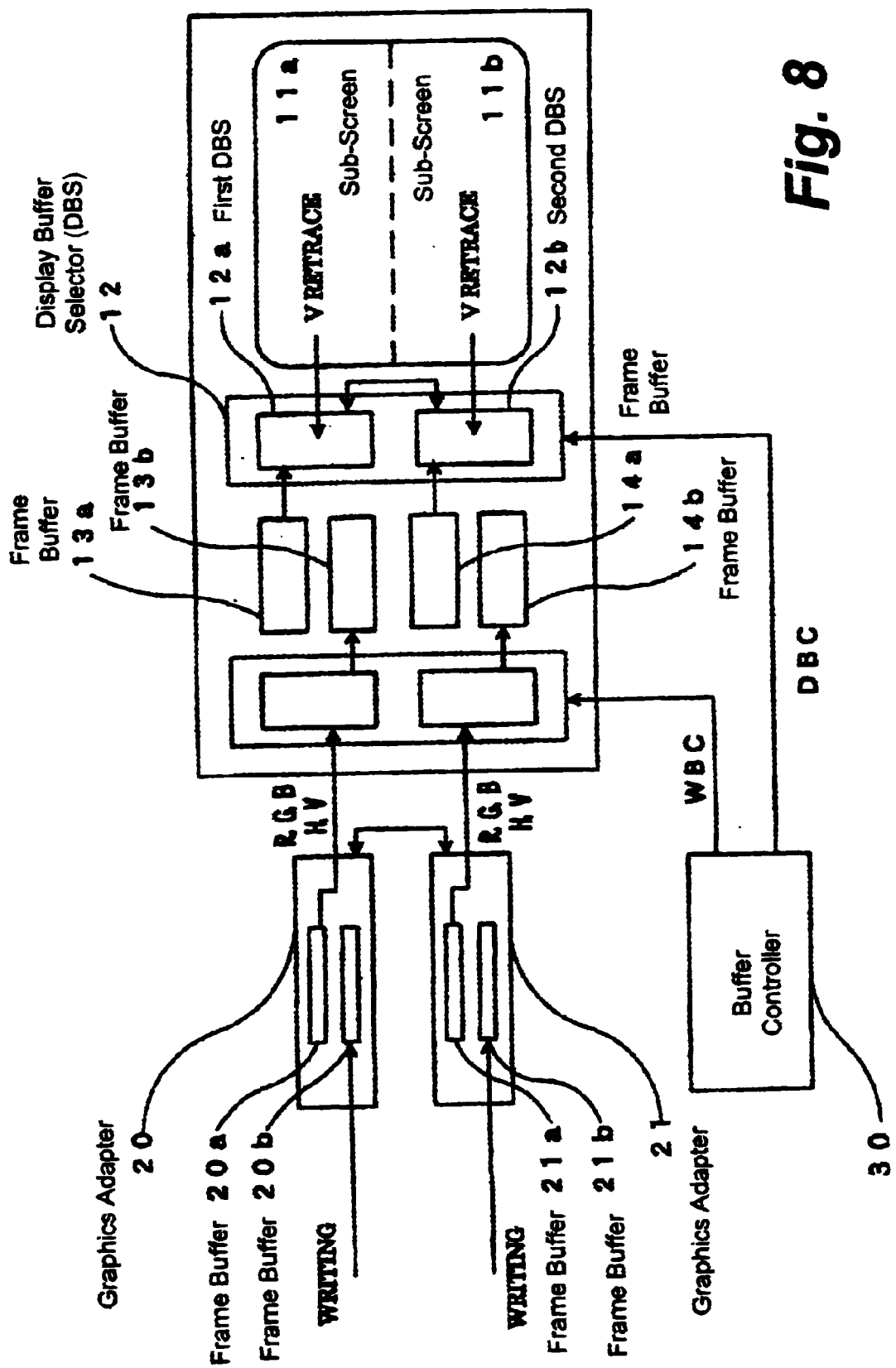
FIG. 8 is a diagram for explaining a step for switching the frame buffers using the monitor system according to this embodiment.

As described above, the completion of the switching from one frame buffer to the other frame buffer, from which the image data is read out to be displayed, is notified to the buffer controller 30. Upon receiving the notification, the buffer controller 30 performs the switching from one frame buffer to the other frame buffer, into which the image data is to be written. In other words, the buffer controller 30 outputs the writing buffer control signal WBC to the writing buffer selector 15 that is in an operation stop state, thus allowing the writing buffer selector 15 to operate. Thus, the writing buffer selector 15 selects the frame buffers 13b and 14b as frame buffers, into which image data is to be written, as shown in FIG. 7. Thereafter, in the graphics adapters 20 and 21, the frame buffers 20b and 21b are selected as frame buffers, into which image data is to be written, as shown in FIG. 8. On the other hand, the frame buffers 20a and 21a are selected as frame buffers, from which image data is to be read out to be displayed.

An operation flow of the display buffer selector 12, the writing buffer selector 15 and the graphics adapters 20 and 21, which are described above, is shown in FIG. 9. Firstly the writing buffer selector 15 is made to be in a hold state from an initial state (S101). Subsequently, the switching from one frame buffer to the other frame buffer, from which image data is to be output to be displayed on the screen 11, is performed. In other words, the display buffer selector 12 is switched (S102). Next, a frame buffer, into which image data is to be written, is newly selected. To be specific, the writing buffer selector 15 is switched (S103). At the time when the switching of the writing buffer selector 15 is completed, in the graphics adapters 20 and 21, the switching from one frame buffer to the other frame buffer, from which image data is to be output, is performed, and the switching from one frame buffer to the other frame buffer, into which image data is to be written, is performed (S104).

Figure 9:
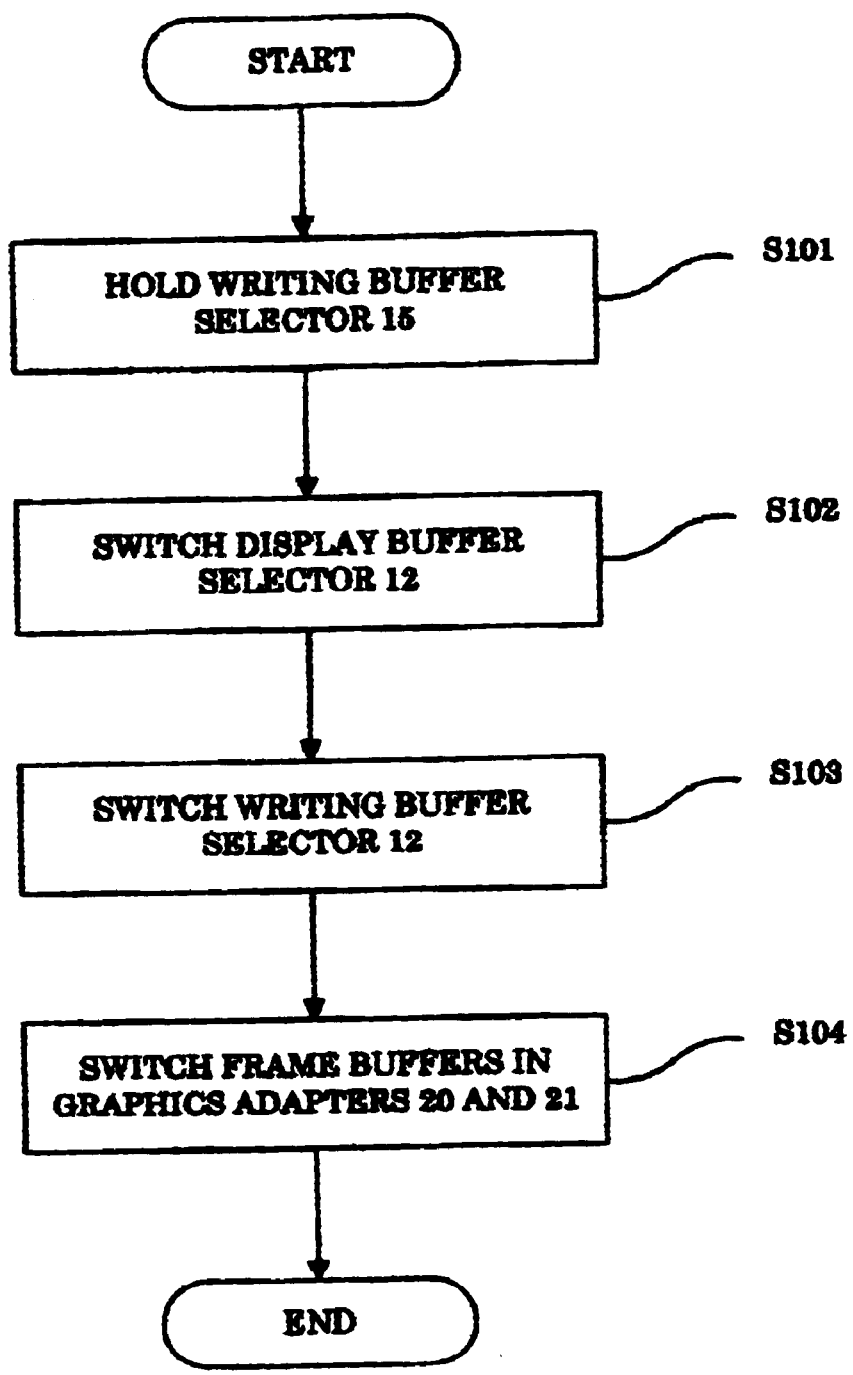
FIG. 9 is a flowchart showing an operation flow of a display buffer selector 12, a writing buffer selector 15 and graphics adapters 20 and 21 in the monitor system according to this embodiment.
Figure 10:
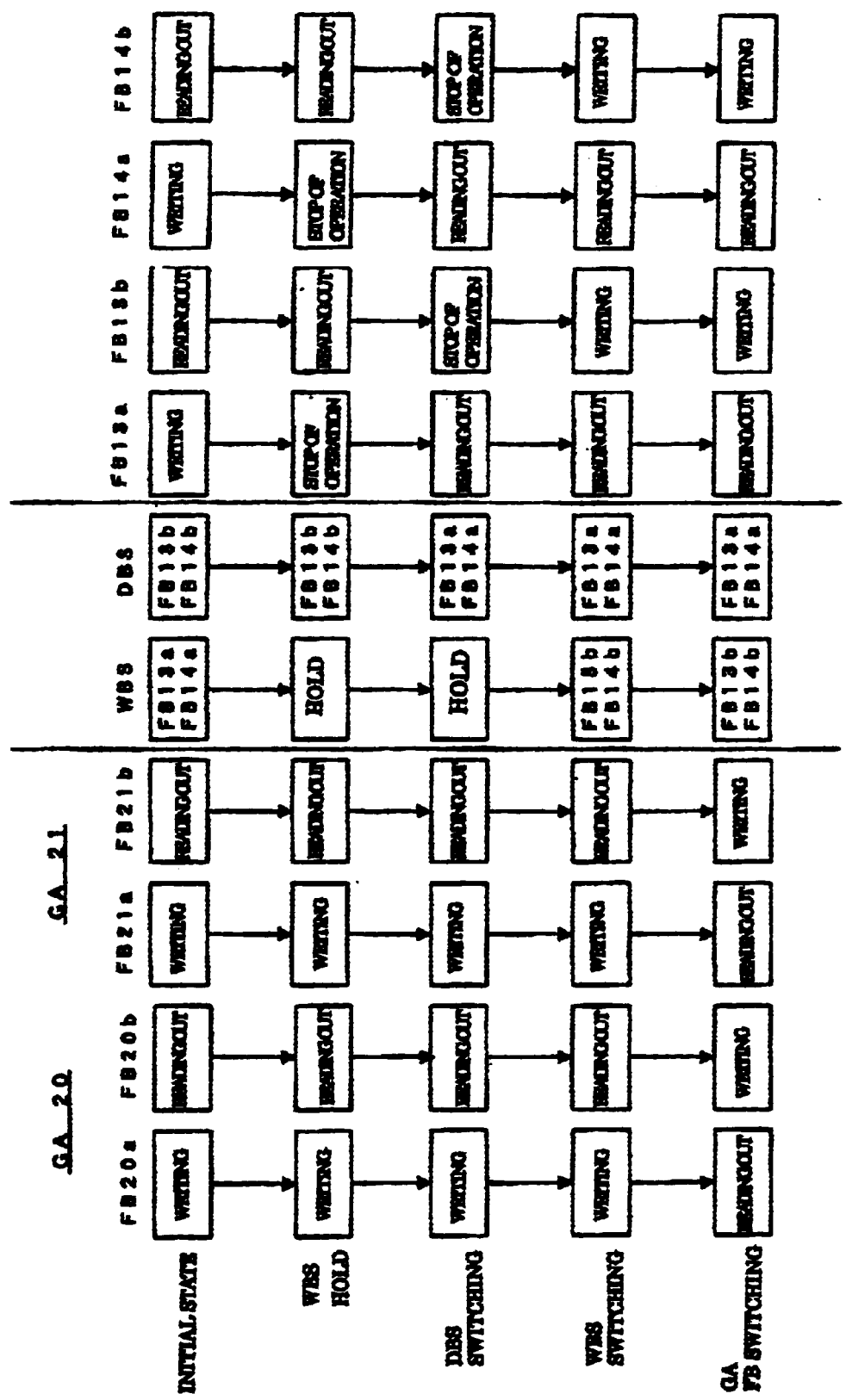
FIG. 10 is a diagram showing an operation state of each frame buffer in the monitor system according to this embodiment.

FIG. 10 is a diagram showing operations of the frame buffers corresponding to the operations of the display buffer selector 12, the writing buffer selector 15 and the graphics adapters 20 and 21, which were described in FIG. 9. Note that in FIG. 10, GA means the graphics adapter, FB means the frame buffer, WBS means the writing buffer selector 15 and DBS means the display buffer selector 12.

In the initial state, the image data is being written into the frame buffer 20a of the graphics adapter 20, and the image data is being read out from the frame buffer 20b thereof. Moreover, the image data is being written into the frame buffer 21a of the graphics adapter 21, and the image data is being read out from the frame buffer 21b thereof. At this time, the writing buffer selector 15 selects the frame buffers 13a and 14a, and the display buffer selector 12 selects the frame buffers 13b and 14b. Consequently, the image data is being written into the frame buffers 13a and 14a. Moreover, the image data is read out from the frame buffers 13b and 14b, and the image data read out therefrom is displayed on the screen 11.

When the writing buffer selector 15 is switched to be in a hold state from the initial state, the frame buffers 13a and 14a that have been writing the image data until the switching of the writing buffer selector 15 are made to be in an operation stop state. Although the writing buffer selector 15 is in the hold state, the frame buffer 20a of the graphics adapter 20 and the frame buffer 21a of the graphics adapter 21 continue to write the image data thereinto, and the frame buffer 20b of the graphics adapter 20 and the frame buffer 21b of the graphics adapter 21 continue to output the image data therefrom. Furthermore, the frame buffer 13b and the frame buffer 14b continue to output the image data therefrom.

When the procedure advances to the switching step of the display buffer selector 12, the display buffer selector 12 selects the frame buffers 13a and 14a as frame buffers from which image data is read out to be displayed. Accordingly, the frame buffers 13a and 14a output the image data written thereto before the initial state. The image data output from the frame buffers 13a and 14a is displayed on the screen 11. At this time, the frame buffers 13b and 14b come not to be selected by the display buffer selector 12, and are not selected also by the writing buffer selector 15. Therefore, the frame buffers 13b and 14b come into an operation stop state. This state also can be said to be a waiting state for writing image data. On the other hand, the frame buffer 20a of the graphics adapter 20 and the frame buffer 21a of the graphics adapter 21 continue to write the image data, and the frame buffer 20b of the graphics adapter 20 and the frame buffer 21b of the graphics adapter 21 continue to output the image data.

After completion of the switching step of the display buffer selector 12, the procedure advances to the switching step of the writing buffer selector 15.

In the switching step of the writing buffer selector 15, the writing buffer selector 15 that has been in the hold state before the switching step selects the frame buffers 13b and 14b. By this selection, the frame buffers 13b and 14b start to write image data thereinto. At this time, the frame buffers 13a and 14a continue to output the image data. Furthermore, the frame buffer 20a of the graphics adapter 20 and the frame buffer 21a of the graphics adapter 21 continue to write the image data, and the frame buffer 20b of the graphics adapter 20 and the frame buffer 21b of the graphics adapter 21 continue to output the image data.

After completion of the switching step of the writing buffer selector 15, the procedure advances to a switching step for switching the frame buffers of the graphics adapters 20 and 21. In this step, the graphics adapter 20 switches the frame buffer 20a that has been writing the image data thereto so as to read-out the image data therefrom. The graphics adapter 20 simultaneously switches the frame buffer 20b that has been reading out the image data therefrom so as to write the image data thereto. Similarly, the graphics adapter 21 switches the frame buffer 21a that has been writing the image data thereto so as to read out the image data therefrom. At the same time, the graphics adapter 21 switches the frame buffer 21b that has been outputting the image data therefrom so as to write the image data thereto.

Thus, a series of the switching operations come to an end.

Next, the switching of reading out the image data among the frame buffers 13a, 13b, 14a and 14b, that is, the switching from one frame buffer to the other frame buffer, from which image data is read out to be displayed, will be described with reference to FIGS. 11 and 12.

Figure 11:
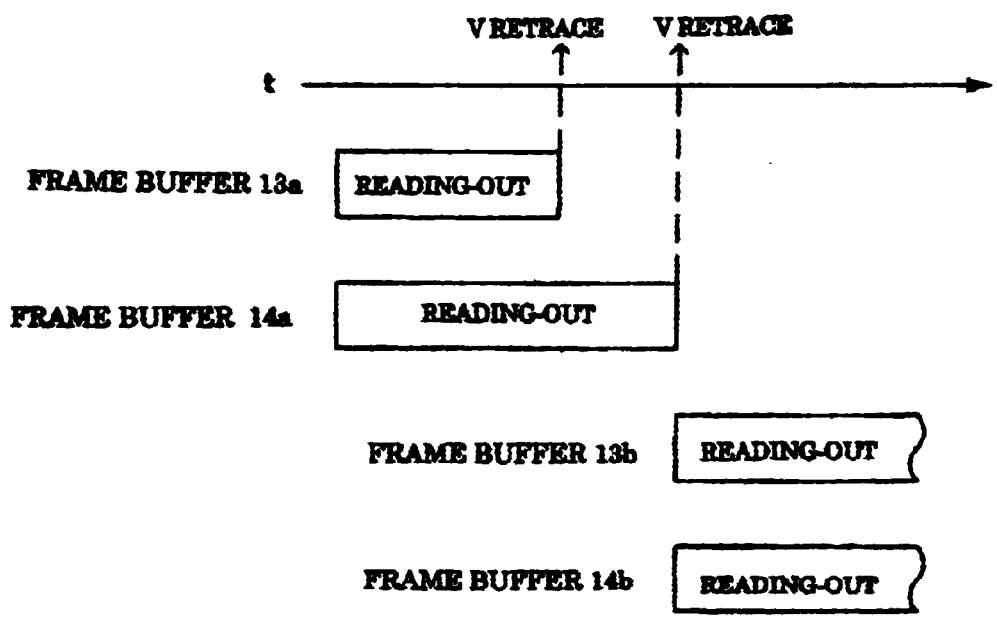
FIG. 11 is a diagram showing an example of reading-out operations of the frame buffers 13a, 13b, 14a and 14b for the time (t).
Figure 12:
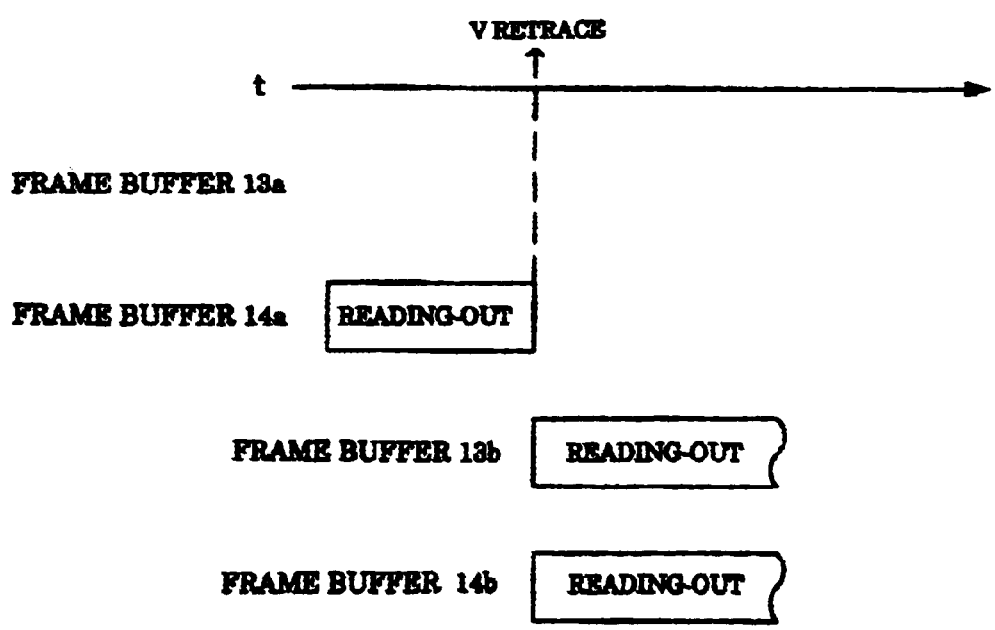
FIG. 12 is a diagram showing another example of the reading-out operations of the frame buffers 13a, 13b, 14a and 14b for the time (t).

FIGS. 11 and 12 are diagrams showing states of the reading-out operations of the frame buffers 13a, 13b, 14a and 14b for the time (t).

In FIG. 11, in the initial state, since the frame buffers 13a and 14a are being selected by the display buffer selector 12 as frame buffers, from which image data is read out to be displayed on the screen 11, the image data is being read out from these two frame buffers 13a and 14a. The reading-out of the image data starts from the beginning end of the frame buffer and completes at the terminal end thereof. If quantities of the image data written in the frame buffers 13a and 14a differ from each other, the time required for the completion of reading out the image data written in the frame buffer 13a differs from that for the completion of reading out the image data written in the frame buffer 14a. In the example of FIG. 11, since the quantity of the image data written in the frame buffer 14a is more than that of the image data written in the frame buffer 13a, the reading-out of the image data from the frame buffer 13a completes earlier than that of the image data from the frame buffer 14a, and, thereafter, the reading-out the image data from the frame buffer 14a completes. In the case of this example, after the reading-out the image data from the frame buffer 14a is completed, a frame buffer, from which image data is read out to be displayed, is switched from the frame buffer 13a to the frame buffers 13b as well as from the frame buffer 14a to the frame buffer 14b, and the image data is read out from the frame buffers 13b and 14b, respectively. In this embodiment, the synchronization of the image data is achieved in the above-described manner.

When the reading-out of the image data from the frame buffer 13a is completed, a vertical retrace (V retrace in FIGS. 5 to 8) of the sub-screen 11a corresponding to the frame buffer 13a is performed. When the reading-out of the image data from the frame buffer 14a is completed, a vertical retrace (V retrace in FIGS. 5 to 8) of the sub-screen 11b corresponding to the frame buffer 14a is performed. Therefore, after the vertical retraces corresponding to the two frame buffers 13a and 14a are performed, the switching of one frame buffer, from which image data has been read out to be displayed, to the other frame buffer, from which image data is to be newly read out to be displayed, is performed. When the switching of the frame buffer is completed, the completion of the switching of the frame buffer is notified to the buffer controller 30, as described above.

FIG. 12 is a diagram showing another example of the reading-out operation of the frame buffers 13a, 13b, 14a and 14b for the time (t). In this example, no image data exists in the frame buffer 13a of the frame buffers 13a and 14a, from which image data to be read out to be displayed. Also in this example, after reading-out of image data from the frame buffer 14a is completed and then a vertical retrace is performed, a frame buffer, from which image data is read out to be displayed, is switched from the frame buffer 13a to the frame buffer 13b as well as from the frame buffer 14a to the frame buffer 14b, similarly to the example shown in FIG. 11.

It is general that a refreshing speed in liquid crystal display panels is 60 Hz at present. Accordingly, there is an advantage that compared to achievement of a synchronization in video signals having a speed on the order of MHz, that is, compared to allowing the graphics adapters 20 and 21 to synchronize with each other, it is easier and lower in cost to allow the frame buffers 13a and 14a as well as the frame buffers 13b and 14b to synchronize with each other.

As described above, according to the present invention, it is possible to realize the monitor system including the display device with a high resolution at low cost. In addition, in such a monitor system, the present invention provides the display device which can allow the switching times of the frame buffers to synchronize with each other.

Although the preferred embodiments of the present invention have been described in detail, it should be understood that various changes, substitutions and alternations can be made therein without departing from spirit and scope of the present inventions as defined by the appended claims.

What is claimed is:

1. A monitor system comprising:
   a display device having a screen in which a display area is virtually divided into a plurality of sub-screens, wherein the display device has two memories for each sub-screen;
   graphics adapters, each of which is provided for the corresponding one of the sub-screens of said display device and has two frame buffers;
   a controller for controlling said graphics adapters;
   writing memory selector for selecting any one of said two memories as a memory, into which image data supplied from said graphics adapter is written; and
   reading-out memory selector for selecting any one of said two memories, from which the image data is read out, wherein said reading-out memory selector is provided in plural number so as to correspond to each sub-screen, and outputs of the image data to be displayed on the screen are made to synchronize among the plurality of said reading-out memory selector.

2. The monitor system according to claim 1, said monitor system further comprising:

controller for controlling a change of the memory selected by said writing memory selecting means, wherein said controller has a function to control said writing memory selector so that said writing memory selector does not select any memory.

3. A liquid crystal display device comprising:

a liquid crystal display panel composed of a plurality of sub-screens, and forming one screen by an assembly of images displayed on said sub-screens;

first and second buffers provided so as to correspond to each of the plurality of sub-screens;

reading-out memory selector for selecting any one of said first and second buffers, from which the image data is read out, wherein said reading-out memory selector is provided in plural number so as to correspond to each sub-screen, and outputs of the image data to be displayed on the screen are made to synchronize among the plurality of said reading-out memory selector;

a writing selector for selecting into which buffer of said first and second buffers image data supplied from the outside should be written; and a display selector for selecting which image data written in said first and second buffers should be displayed on said sub-screens.

4. The liquid crystal display device according to claim 3, said liquid crystal display device further comprising:

a selector controller for controlling selections of said writing selector and said display selector, wherein said writing selector and said display selector switch the selection of said first and second buffers based on an instruction from the selector controller.

5. The liquid crystal display device according to claim 3, wherein said display selector switches the selection of said first and second buffers after completion of reading out the image data either from said first buffer and from said second buffer, which is being selected by said display selector.

6. A display device for displaying images onto a plurality of sub-screens, the display device comprising:

an image data storing section having a plurality of double buffers;

first selector provided for each of said double buffers, the first selector selecting to which buffer of said double buffers image data transferred from the outside is to be stored;

second selector provided for each of said double buffers, the second selector selecting from which double buffer the image data is to be read out, wherein said second selector is provided in plural number so as to correspond to each sub-screen, and o outputs of the image data to be displayed on the sub-screens are mad to synchronize among the plurality of said second selector;

an image display panel for displaying an image based on the image data read Out from the selected buffer by said second selector; and a controller for issuing an instruction to select a buffer to said first or second selectors.

7. The display device according to claim 6, wherein said second selector notifies said controller of completion of reading-out of said image data in all of said double buffers, and said controller issues an instruction to witch a selection to said first selector based on the notification from said second selector.

8. A method of displaying an image on a display device in which first and second frame buffers are provided so as to correspond to each of partial display areas obtained by dividing a display area, comprising:

a first step of reading out image date written in said second frame buffer while image data is being written into said first frame buffer, and displaying the image data read out from said second frame buffer on said partial display areas;

a second step of stopping an operation of said first frame buffer after completion of writing of the image data into said first frame buffer;

a third step of reading out the image data written in said first frame buffer by a plurality of reading-out memory selectors corresponding to each of said partial display areas after stopping the operation of said first frame buffer, and displaying the image data read out from said first frame buffer on said partial display areas;

a fourth step of writing image data into said second frame buffer; and a fifth step synchronizing said image data read out by said plurality of reading-out memory selectors.

9. The method of displaying an image on a display device according to claim 8, wherein said third step is begun after the reading-out of all the image data written in said second frame buffer in said first step is completed in said second frame buffer.

10. The method of displaying an image on a display device according to claim 8, wherein said third step is begun after a retrace is completed in all of said partial display areas.

* * * * *